March 10, 1953 P. R. CARLON 2,630,713
FLUID METER ADJUSTABLE CALIBRATION DEVICE
Filed April 5, 1949 3 Sheets-Sheet 1

INVENTOR
Paul R. Carlon
By Strauch + Hoffman
Attorneys

March 10, 1953  P. R. CARLON  2,630,713
FLUID METER ADJUSTABLE CALIBRATION DEVICE
Filed April 5, 1949  3 Sheets-Sheet 2
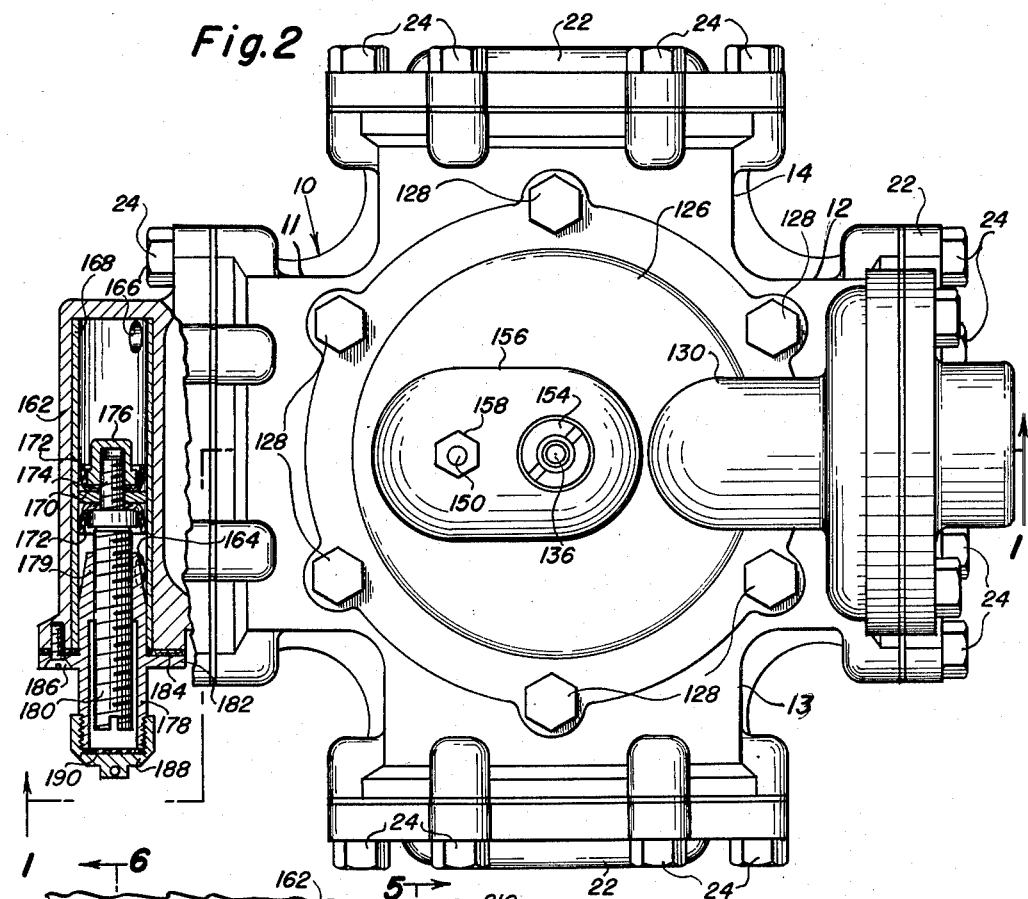
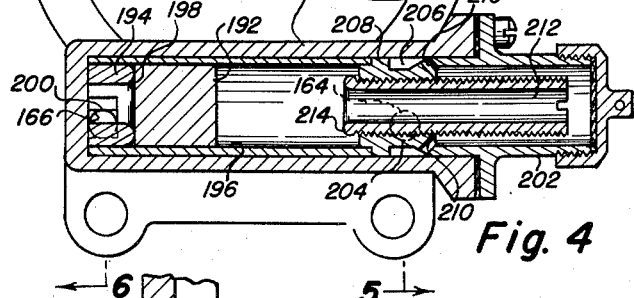
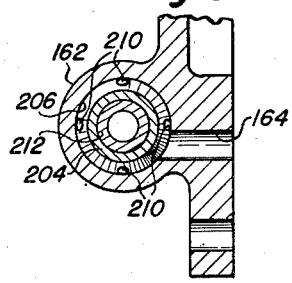
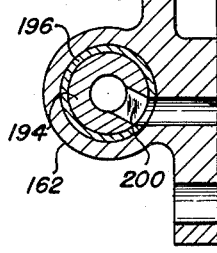
INVENTOR
Paul R. Carlon
By Strauch + Hoffman
Attorneys March 10, 1953  P. R. CARLON  2,630,713
FLUID METER ADJUSTABLE CALIBRATION DEVICE
Filed April 5, 1949  3 Sheets-Sheet 3

INVENTOR
Paul R. Carlon

By Strauch & Hoffman
Attorneys

Patented Mar. 10, 1953

2,630,713

UNITED STATES PATENT OFFICE 2,630,713

FLUID METER ADJUSTABLE CALIBRATION DEVICE

Paul R. Carlon, Pittsburgh, Pa., assignor to Rockwell Manufacturing Company, Pittsburgh, Pa., a corporation of Pennsylvania Application April 5, 1949, Serial No. 85,499

2 Claims. (Cl. 73—247)

This invention relates to fluid meters, more particularly piston type displacement meters, and has for its general object and purpose to provide a meter of minimum size and weight having certain novel features of construction which will efficiently function to produce a steady flow of liquid through the meter with a minimum of pulsation at the capacities required for service station use.

Another object of the invention is to provide a meter of this type which embodies a minimum number of closely coordinated elements in a positively functioning organization, in which loosely articulated connections and lost motion in the relative movement of the parts is eliminated to thus insure a high degree of accuracy in the measurement of the meter output.

A more specific object of the invention resides in the provision of an adjustable calibration device which is structurally independent of the working parts of the meter and easily accessible and connected with the liquid inlet and discharge passages of a pair of piston cylinders for operation by differential liquid pressure across the pistons to variably control the exact amount of liquid discharged through the meter outlet during each cycle of the meter.

It is also an additional object of the invention to provide a fluid meter as above characterized, the principal working parts of which may be easily fabricated by conventional production methods, thus conducing to large scale manufacture at comparatively low cost.

With the above and other objects in view, the invention comprises the improved fluid meter and the construction and arrangement of its several parts, as will hereinafter be more fully described, illustrated in the accompanying drawings and subsequently incorporated in the subjoined claims.

Referring in detail to the drawings, wherein I have disclosed several simple and practical embodiments of the present invention, and in which similar reference characters designate corresponding parts throughout the several views:

Figure 2 is a top plan view partly in section showing the adjustable calibration device according to a preferred embodiment of the invention;

Figure 4 is an enlarged longitudinal sectional view illustrating a modified form of the adjustable calibration device mounted on one of the piston cylinder heads;

Figure 5 is a vertical transverse section taken substantially on the line 5—5 of Figure 4; and Figure 6 is a similar sectional view taken substantially on the line 6—6 of Figure 4.

Figure 1:
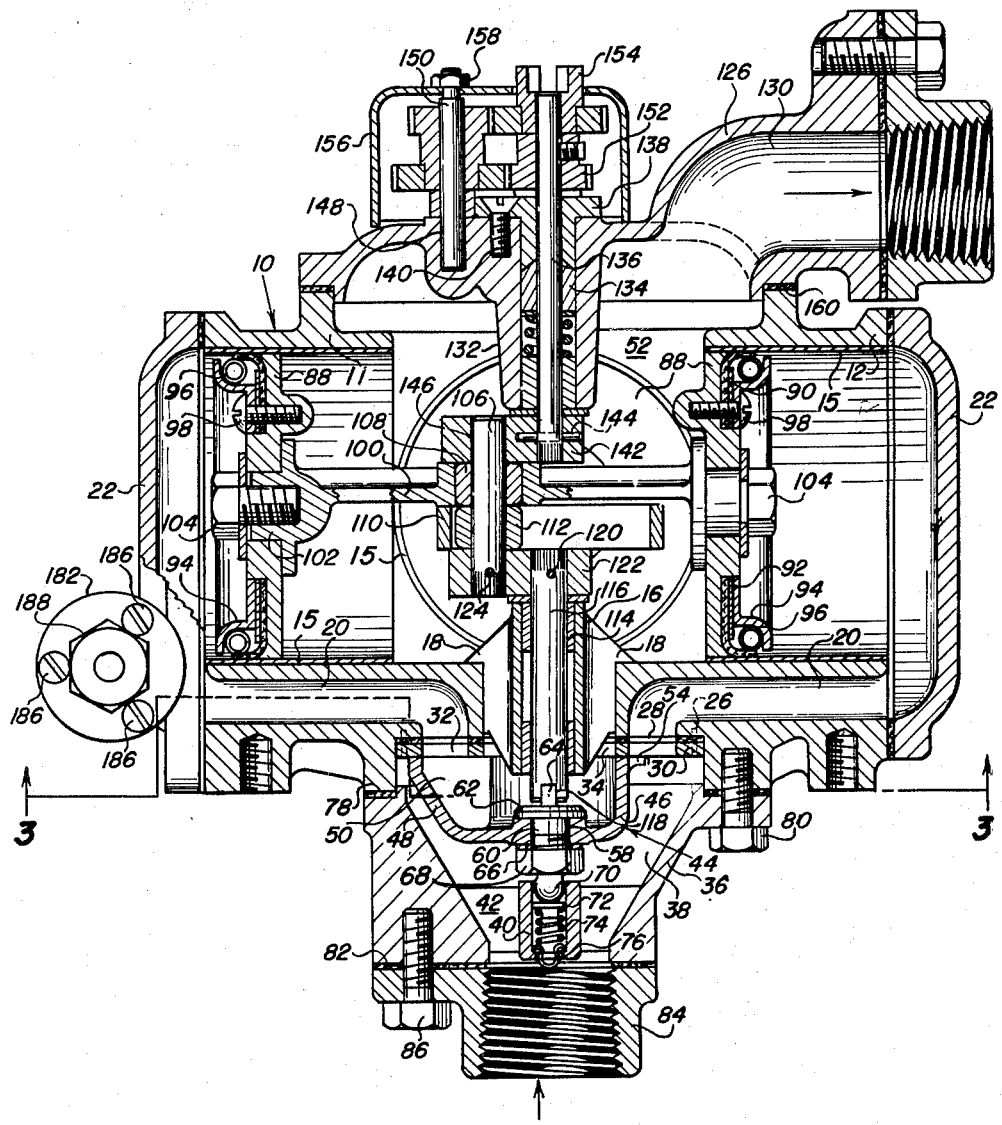
Figure 1 is a central vertical section through a pair of the piston cylinders showing the means for operatively connecting the pistons with the fluid inlet and outlet control valve and the register drive mechanism.

Referring in further detail to the drawings, for the purpose of the present explanation, I have shown the meter body 10 in the form of a die cast aluminum cylinder block having four horizontally disposed cylinders, 11, 12, 13 and 14 spaced apart 90°. A brass liner sleeve 15 is pressed into each cylinder, and then rolled and burnished to the required diameter. Between the cylinders at the lower sides thereof and coaxial with the vertical center line of the meter body a bearing sleeve 16 is integrally connected with the cylinder walls by spaced webs 18. The wall of each cylinder at the lower side thereof is relatively thick and provided with a longitudinally extending passage 20 opening downwardly at its inner end through the cylinder wall and in communication at its outer end with the associated cylinder. The outer end of each cylinder is closed by a head 22 secured thereto by the cap screws 24.

In the cylinder block between the inner ends of passages 20 dowel pins indicated at 26 are inserted to accurately locate a gasket 28 coated with a suitable adhesive and a valve seat plate 30. The plate 30 is provided with four circumferentially extending slots or openings which register with the inner ends of the passages 20 in the walls of the respective cylinders, said plate also having a central circular opening 34 which registers with the annular space between the bearing sleeve 16 and the cylinder walls. Of course the gasket 28 is provided with similar slots and a central opening.

A bottom cover member 36 has an upwardly flaring fluid inlet passage 38 and at the lower end thereof an axially disposed upwardly opening bearing socket 40 is connected with the wall of said passage by a plurality of radial webs 42.

The valve assembly comprises a rotary valve member 44 which is centrally formed with a hollow cylindrical portion 46 having a quadrant shaped lateral extension 48 to register with the slots 32 in the valve seat plate 30 and providing a fluid outlet receiving chamber 50 in constant communication through the central opening 34 in said plate and with the interior of the meter body or cylinder block which forms a common fluid outlet receiving chamber 52 for the four piston cylinders. At the upper open side of the chamber 50, valve member 44 is provided at diametrically opposite sides thereof with flanges 54 extending circumferentially from the ends of the quadrant shaped portion 48 of chamber 50 and terminating in spaced relation from each other to provide a space or recess which is substantially equal to the length of the slots 32 in the valve seat plate 30.

The lower end wall of the cylindrical portion 46 of the valve member is provided with an axially centered cylindrical opening 58 in which a coupling member 60 is inserted, said member at its upper end having a head or flange 62 provided with a male coupling part 64. The lower end of member 60 is threaded and receives the lock washer 66 and jam nut 68 whereby said member is securely held against rotation or axial displacement relative to the valve member 44.

The lower end face of member 60 has a concave seat for the stainless steel bearing ball 70 disposed in the upper open end of the socket 40 upon a cap plate 72 on the upper end of a coil spring 74 which is secured at its lower end to the base wall of socket 40 by a suitable wire clip 76. Thus the valve member 44 is yieldingly urged upwardly into close seating contact with the lower face of the plate 30.

The cover member 36 is rigidly secured to the cylinder block upon the interposed gasket 78 by suitable cap screws 80 and to the lower end of said cover member a gasket 82 and a pipe coupling member 84 are applied and secured by the cap screws 86.

Each of the cylinders, 11, 12, 13, and 14 contains a reciprocating piston which comprises the piston head 88, a cup leather 90, spacing plate 92, piston skirt 94 and an annular coil spring 96 between the skirt 94 and the free edge of cup leather 90. These elements are secured in assembled relation by a plurality of screws indicated at 98.

As seen in Figure 1 of the drawings, the diametrically opposed pair of pistons in cylinders 11 and 12 are rigidly connected by a top Scotch yoke rod 100. As herein shown, the ends of this rod are formed with internal threaded bosses 102 disposed in axially centered openings in the respective piston heads 88 to receive the locking screws 104. The elongated slot in rod 100 receives the crank pin 106 and roller 108 loosely mounted thereon. A similar bottom Scotch yoke rod 110 rigidly connects the pistons in the other pair of cylinders 13 and 14 and crank pin 106 extends downwardly through the elongated slot in said rod with a second roller 112 loosely mounted on the crank pin disposed in said slot.

Bushings 114 are press fitted in the upper and lower ends of sleeve 16 and in these bushings the vertically disposed valve operating shaft 116 is journalled. At its lower end, said shaft is provided with a diametrically disposed slot or recess 118 which receives the male coupling lug 64 on the upper end of member 60. At its upper end the shaft 116 is non-rotatably connected by pin 120 to one end of crank arm 122. To the other end of this crank arm, the lower end of crank pin 106 is non-rotatably connected by the pin 124.

The top cover member 126 for the cylinder block is adjustably secured to said block by a plurality of cap screws 128 and is formed with a radially extending outlet neck 130 in communication with the chamber 52 of the cylinder block.

The cover member 126 is formed with an axially centered depending boss 132 having a stuffing box 134 for the register drive shaft 136. The stuffing box gland 138 has a flanged end secured to the upper surface of the cover member 126 by screws as indicated at 140. To the lower end of shaft 136 one end of crank arm 142 is non-rotatably fixed by the pin 144, the other end of said arm being provided with an opening 146 to receive the upper end of crank pin 106.

In laterally spaced relation from the shaft 136, cover member 126 is formed with a vertical bore 148 into which the lower end of a stationary shaft 150 is pressed. Upon this shaft and the upper end of shaft 136, speed reduction gearing, generally indicated at 152, is mounted, the final element of the gear train being rotatable relative to shaft 136 and provided with an upwardly projecting coupling element 154 for engagement with a complementary coupling element on the register shaft (not shown). The gearing is enclosed in housing member 156 which is secured in fixed relation to the cover member by nut 158 threaded upon the upper end of stationary shaft 150.

When the cover assembly is positioned over the chamber 52 in the cylinder block, the position of crank arm 142 is adjusted so that the upper end of crank pin 106 will be rotatively received in the opening 146 in said arm and with the register drive shaft 136 in coaxial alignment with valve operating shaft 116. Since shaft 136 is axially centered in the cover member, said member may be adjusted about the shaft axis to dispose outlet 130 of said member in a selected radial position with respect to said shaft and the meter cylinders. A gasket 160 is disposed between the cylinder block and cover member 126 and said cover member tightly secured in its adjusted position by the cap screws 128.

Figure 3:
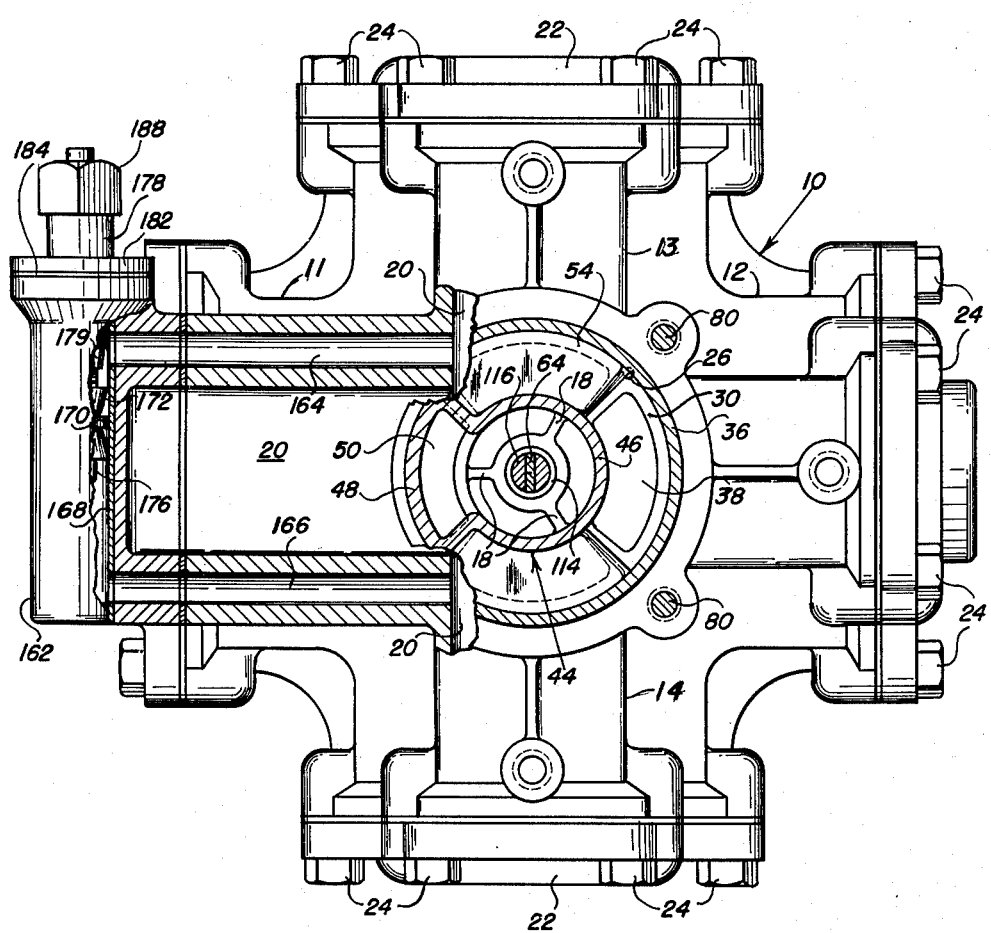
Figure 3 is a horizontal sectional view taken substantially on the line 3—3 of Figure 1, showing the connecting passage ways between said adjustable device and one pair of the piston cylinders.

Referring now to Figures 2 and 3 of the drawings, upon the head 22 of a cylinder 11, below the center thereof, a small diameter cylinder 162 is integrally formed with its axis disposed substantially normal to the axis of the shafts 116 and 136 and parallel to the axis of the cylinders 13 and 14. Adjacent to its opposite ends, this cylinder 162 is connected by passages 164 and 166 with the inner ends of the respective inlet and outlet passages 20 of cylinders 13 and 14, as clearly shown in Figure 3.

A small light weight piston may reciprocate freely in the liner sleeve 168 of the cylinder 162, said piston comprising the head 170 and cup leathers 172 secured to opposite sides of said head by the screw 174 and bonnet nut 176. A sleeve 178 has an externally tapered end portion 179 extending into one end of cylinder 162. This end of the sleeve is internally threaded to receive the adjusting screw 180. Intermediate of its ends sleeve 178 is formed with an external flange 182. A gasket 184 is interposed between this flange and the end of cylinder 162 and said flange secured to the cylinder by screws 186. The outer end of sleeve 178 is externally threaded to receive a cap member 188 which tightly clamps the edge of a sealing gasket 190 against the end of the sleeve wall.

It will be evident from the above that the length of the reciprocating stroke of the piston in cylinder 162, in the alternate admission of inlet fluid pressure to said cylinder through passages 164 and 166, is limited by contact of the nut 176 with one end of the cylinder and contact of the head of screw 174 with the end of the adjustable screw 180. Therefore, by removing cap 188 and adjusting screw 180 with respect to sleeve 178, the length of the stroke of the piston and the volume of liquid expelled from the cylinder through passages 164 and 166 into the meter outlet may be regulated as desired. This control of the volume of fluid discharged from cylinder 62 is therefore a control of the total volume of fluid discharged from the meter during each cycle.

The above described adjustment device is satisfactory in operation until such wear of the cup leathers 172 occurs as will cause leak across the cylinder between the passages 164 and 166. Therefore in Figure 4 of the drawings I have illustrated another embodiment of this device which avoids this possibility and effectively seals the piston at each end of its stroke. This construction includes a solid one-piece free piston 192 of light weight metal or plastic, such as "nylon." An annular seat member 194 is pressed into one end of the cylinder liner 196 and at one end has an annular surface 198 against which the piston 192 seats tightly at the end of its movement in one direction. The ends of passages 164 and 166 are off-set from the axial center line of the cylinder and the member 194 is cut away as indicated at 200 to permit of the free flow of liquid through said passage 166 into and from the cylinder 162.

In this modified construction, the sleeve 202 has a flanged portion for attachment to the end of cylinder 162 as above described, which is of comparatively large internal and external diameter, and an inner portion 204 of reduced internal and external diameter to form an annular chamber 206 between said inner end portion of the sleeve and the wall of the cylinder which is in fluid communication with the passage 164. The end portion 204 of the sleeve is internally threaded and formed with a flange 208 snugly engaged with the cylinder wall and a terminal portion fitted within the end of liner sleeve 196. At the juncture of the reduced portion 204 of the sleeve with the large diameter portion thereof a plurality of openings 210 are formed through the sleeve wall to establish fluid communication between chamber 206 and the bore of a hollow adjusting screw 212 threaded in the end portion 204 of the sleeve. The adjusting screw 212 terminates at its inner end in an annular valve seat 214. Thus by the adjustment of the screw 212 the amount of liquid which is discharged through the passages 164 and 166 into the meter outlet at each stroke of the piston 192 may be predetermined as desired, thus calibrating the entire meter to discharge a predetermined volume of liquid per cycle of the meter.

From the foregoing description, the operation of the improved meter will be readily understood.

With the valve member 44 in the position shown in Figure 1 of the drawings, the fluid under pressure flows through inlet chamber 38, between the spaced flanges 54 of the valve member and the uncovered opening 32 in valve seat plate 30 and hence through passage 20 into the outer end of the right hand cylinder 12. Since the pistons in the opposed cylinders 11 and 12 are rigidly connected to move as a unit, as the liquid pressure in the right hand cylinder 12 forces the piston therein to the left, the piston in the left hand cylinder 11 moves correspondingly therewith, and thus forces liquid from the latter cylinder through passage 20 thereof and the opening 32 in valve seat plate 30 which is in registration with the chamber 50 of valve member 44. The fluid then passes upwardly through opening 34 and around sleeve 16 into the chamber 52 of the cylinder block from which it flows through the outlet 130 on cover member 126. As the pistons are operatively connected with valve 44, said valve is rotated in properly timed relation with the reciprocation of the pistons to alternately connect the passages 20 of the opposed cylinders with the inlet and outlet sides respectively of the valve in proper sequence.

In the operation of the meter, the passages 164 and 166, and the portions of calibration adjustment cylinder 162 not occupied by the piston and the adjusting means are filled with liquid. Thus when valve 44 opens communication through passage 20 between valve inlet chamber 38 and the meter cylinder 13, the cylinder 14 is connected to the meter outlet through valve chamber 50 and the higher inlet pressure is effective through passage 164 and one end of cylinder 162 to rapidly move the adjustment piston into contact with the end wall of the cylinder near the entrance of passage 166 and thereby discharge liquid from cylinder 162 through passages 166 and 20 into outlet chamber 50 of the valve along with the liquid discharged into the outlet from the cylinder 14. When the position of the meter valve 44 is reversed, the higher inlet pressure will then be applied to cylinder 162 through the passage 166, thus quickly displacing the calibration adjustment piston in the opposite direction into contact with adjustment screw 180, and expelling liquid from said cylinder through passages 164 and 20 into the outlet chamber 50 of the valve along with liquid discharged by the cylinder 13. Adjustment of screw 180 varies the volume of fluid discharged by the meter per cycle and therefore is calibration adjustment for the meter.

The adjustment device of the embodiment shown in Figure 4 of the drawings operates in a similar manner, except that in the movement of piston 192, the liquid is not discharged from the cylinder directly through passage 164 but flows through the bore of adjusting screw 212 into the outer end of sleeve 202 and through openings 210 into the annular chamber 206 from which it is expelled under pressure through the passage 164 and the cylinder passage 20 to the outlet chamber of the valve 44.

The above described meter is primarily designed for service station use, and it will be seen that by means of the present improvements, I provide a meter of minimum weight and size in which a steady flow of liquid through the meter to the outlet thereof is obtained, with a minimum of pulsation. Thus as the register drive shaft 136 is operated by the reciprocating pistons a more accurate registration of the volume of liquid passing through the meter will be obtained as a substantially uniform pressure is maintained on the coupled pistons with a very low pressure loss which tends to minimize leakage past the pistons and the valve. The novel calibration adjustment is energized by the differential in meter inlet and outlet pressure and is simple in construction as well as mechanically independent of the working parts of the meter. Since it is not connected to the moving parts of the meter, it does not place any added or unbalanced strain on them and this tends to reduce pulsation in the meter. The present invention provides a minimum number of working parts in the meter which are of simple and rugged structural form and can be embodied in a very compact assembly at low manufacturing cost for efficient and reliable operation.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a fluid meter having opposed piston cylinders, inlet and outlet ports and a separate fluid passage communicating with each of said cylinders, each passage being adapted to permit the flow of fluid to and away from the respective cylinders, and a common valve means operable to alternately establish communication between the said fluid passages and the said inlet and outlet ports; a calibration cylinder, conduits connecting opposite ends of said calibration cylinder to a pair of said fluid passages, a reciprocable piston in said calibration cylinder responsive to the pressure differential between said passages and adapted to discharge a predetermined volume of fluid under pressure into said outlet port, means for variably regulating the volume of fluid discharged by said calibration cylinder including a coaxial sleeve fixed in one end of said calibration cylinder and having portions extending externally and internally thereof, the latter portion of the sleeve having an annular groove forming an annular fluid receiving chamber with the cylinder wall and having openings between said groove and the interior of said sleeve to place said chamber in communication with the conduit connected to one of said ends of the calibration cylinder, and an adjustable hollow screw, open at each end, threaded coaxially into the said internally extending portion of the sleeve and having a seat on the inner end for said piston, said screw and the remaining portion of the sleeve forming a fluid receiving chamber connected through said screw with the cylinder and through said openings in the sleeve wall with said annular chamber, and a removable cap closing the outer end of said sleeve.

2. In a fluid meter defined in claim 1, an annular seat member for the piston in the other end of said cylinder, internally connected with the conduit to the latter end of the cylinder.

PAUL R. CARLON.

REFERENCES CITED

The following references are of record in the file of this patent:

UNITED STATES PATENTS

| Number | Name | Date |
| --- | --- | --- |
| 1,949,006 | Brubaker | Feb. 27, 1934 |
| 2,042,767 | Brubaker | June 2, 1936 |
| 2,103,482 | McCandless | Dec. 28, 1937 |
| 2,144,748 | Arnold et al. | Jan. 24, 1939 |
| 2,163,794 | McCandless | June 27, 1939 |
| 2,200,154 | Cadet | May 7, 1940 |
| 2,208,950 | Risser et al. | July 23, 1940 |
| 2,241,132 | Horton | May 6, 1941 |

FOREIGN PATENTS

| Number | Country | Date |
| --- | --- | --- |
| 404,099 | France | Oct. 11, 1909 |